United States Patent
He et al.

(10) Patent No.: US 7,676,707 B2
(45) Date of Patent: Mar. 9, 2010

(54) DEVICE AND METHOD FOR TESTING SAS CHANNELS

(75) Inventors: Lei He, Tianjin (CN); Quan-Jie Zheng, Tianjin (CN); Jhih-Ren Jin, Tianjin (CN); Jeff Song, Taipei (TW); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 366 days.

(21) Appl. No.: 11/928,591

(22) Filed: Oct. 30, 2007

(65) Prior Publication Data
US 2009/0113257 A1 Apr. 30, 2009

(51) Int. Cl.
*G01R 31/28* (2006.01)
(52) U.S. Cl. ...................... 714/714; 714/716
(58) Field of Classification Search .......... 714/712, 714/713, 714, 716; 711/112; 439/67, 55; 719/326
See application file for complete search history.

(56) References Cited

U.S. PATENT DOCUMENTS 7,447,834 B2 * 11/2008 Burroughs et al. .......... 711/112
2008/0003845 A1 * 1/2008 Hong et al. ................. 439/67
2008/0010647 A1 * 1/2008 Chapel et al. ............... 719/326
2009/0291571 A1 * 11/2009 Davis et al. ................. 439/55

* cited by examiner

*Primary Examiner*—David Ton
(74) *Attorney, Agent, or Firm*—Morris, Manning & Martin LLP; Tim Tingkang Xia

(57) ABSTRACT

A device and a method for testing SAS channels which are applied to a plurality of pairs of SAS interfaces. The testing device includes a control terminal, a PCI-E microprocessor, a PCI-E-to-SAS adaptor, and a signal feedback module. The control terminal is used for selecting SAS channels and sending a control command; the PCI-E microprocessor is used for receiving the control command and sending a test signal to a PCI-E channel according to the control command; the PCI-E-to-SAS adaptor is used for converting a transmission signal between the PCI-E channel and the SAS channels; and the signal feedback module is used for connecting a first SAS interface to a second SAS interface in the SAS back plate. The PCI-E microprocessor compares whether the test signal sent to the first SAS channel is consistent with the test signal received from the second SAS interface.

9 Claims, 5 Drawing Sheets

DEVICE AND METHOD FOR TESTING SAS CHANNELS

BACKGROUND OF THE INVENTION

1. Field of the Invention

The present invention relates to a device and a method for testing SAS channels. More particularly, the present invention relates to a bridge device for testing SAS channels by using a PCI-E channel and a testing method thereof.

2. Related Art

Serial attached SCSI (SAS) interface is a new generation of small computer small interface (SCSI interface). SAS is a novel interface developed following the parallel SCSI interface. Therefore, the SAS interface can provide the function of multi-interface connection and the data can be transmitted bi-directionally at a rate of 6 Gb/s. Additionally, through the design of reducing the connection wire, the SAS interface has the advantage of reducing the inner space of the system, and the SAS interface is also backward compatible, for example, SATA (Serial ATA) hard disks.

SAS channels utilizes low voltage difference signals (LVDS) for data transmission, and each pair of difference lines has TX+, TX−, RX+, and RX− respectively according to the criterion of SAS. On each pair of difference lines, the data transmission speed of 1.5 Gbps and 3.0 Gbps can be utilized. The transmission voltage (TX) and the receiving voltage (RX) used by the SAS channels are 800-1600 mV and 275-1600 mV respectively.

Referring to FIG. 1a, it is a schematic view of a conventional connection between a server and SAS hard disks. A conventional process for testing SAS channels includes, connecting a control terminal 110 to an SAS hard disks 130 through an SAS back plate 120; performing an accessing operation to the SAS hard disks 130 by a detection program; and finally, detecting whether the SAS channels can access normally by means of reading from and writing to the SAS hard disks 130. The SAS back plate 120 respectively has a plurality of pairs of SAS interfaces 121 thereon, for respectively connecting the SAS hard disks 130 to the SAS interfaces 121. Referring to FIG. 1b, it is a flow chart of the detection of conventional SAS channels. First of all, the SAS hard disks under test are installed on the SAS back plate (S110). Next, the testing programs of the system are activated (S120). Then, the testing programs perform an accessing operation to the SAS hard disks (S130). Finally, the system under test receives a test report about the accessing operation of the SAS hard disks (S140).

However, as the SAS back plate 120 has 8-16 SAS interfaces 121 therein, and in Step S110, the SAS back plate 120 and the SAS hard disks 130 must be replaced through manual operation, it is quite time-consuming when disassembling/assembling the equivalent number of SAS hard disks 130. Additionally, when rebooting the system, additional time is needed. In this way, the overall testing time is prolonged, and thus the testing efficiency is lowered.

SUMMARY OF THE INVENTION

Accordingly, the present invention is mainly directed to a device for testing SAS channels, applicable for a plurality of pairs of SAS interfaces included by an SAS back plate to detect whether the sent signal is consistent with the received signal of the selected pair of SAS channels when transmitting data.

In order to achieve the above objective, the present invention provides a device for testing SAS channels, which includes a control terminal, a PCI-E microprocessor, a PCI-E-to-SAS adaptor, and a signal feedback module. The control terminal is used for selecting SAS channels and sending a control command; the PCI-E microprocessor is electrically connected to the control terminal and a PCI-E channel, for receiving the control command from the control terminal and sending a test signal to the PCI-E channel according to the control command; the PCI-E-to-SAS adaptor is electrically connected to the PCI-E channel and the SAS back plate, for converting a transmission signal between the PCI-E channel and the SAS channels. The SAS back plate further includes a plurality of pairs of SAS interfaces, and each pair of the SAS interfaces is electrically connected to one signal feedback module respectively.

A first SAS interface and a second SAS interface in the SAS back plate are electrically connected with each other through the signal feedback module, such that the first SAS interface outputs the received test signal to the second SAS interface, and the second SAS interface sends the received test signal back to the PCI-E microprocessor.

In another aspect of the present invention, the present invention provides a method for testing SAS channels, which includes the following steps: providing a PCI-E-to-SAS adaptor, for connecting a PCI-E channel to an SAS back plate; providing a signal feedback module electrically connected to the SAS back plate, for connecting a first SAS interface to a second SAS interface in the SAS back plate; and using a PCI-E microprocessor to send a test signal and transferring the test signal to the first SAS interface through the PCI-E channel and the PCI-E-to-SAS adaptor; outputting the test signal to the second SAS interface by the first SAS interface, and sending the test signal back to the PCI-E microprocessor through the PCI-E-to-SAS adaptor and the PCI-E channel by the second SAS interface; and using the PCI-E microprocessor to compare whether the test signal sent to the first SAS channel is consistent with the test signal received from the second SAS interface.

In the present invention, besides using the PCI-E channel for bridging the SAS channel, the test signal passed through the first SAS interface is further transferred to the second SAS interface through the signal feedback module, and then, the second SAS interface sends the test signal back to the PCI-E microprocessor. The PCI-E microprocessor is used to compare whether the test signal sent to the first SAS channel is consistent with the test signal received from the second SAS interface. Therefore, it is unnecessary to use SAS hard disks in the present invention, such that the time required for disassembling and assembling the SAS hard disks is saved, and various SAS channels can be detected in sequence. Additionally, the maximum channel bandwidth of the PCI-E can be 10 GB, which is absolutely sufficient for supporting the SAS channel bandwidth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1A:
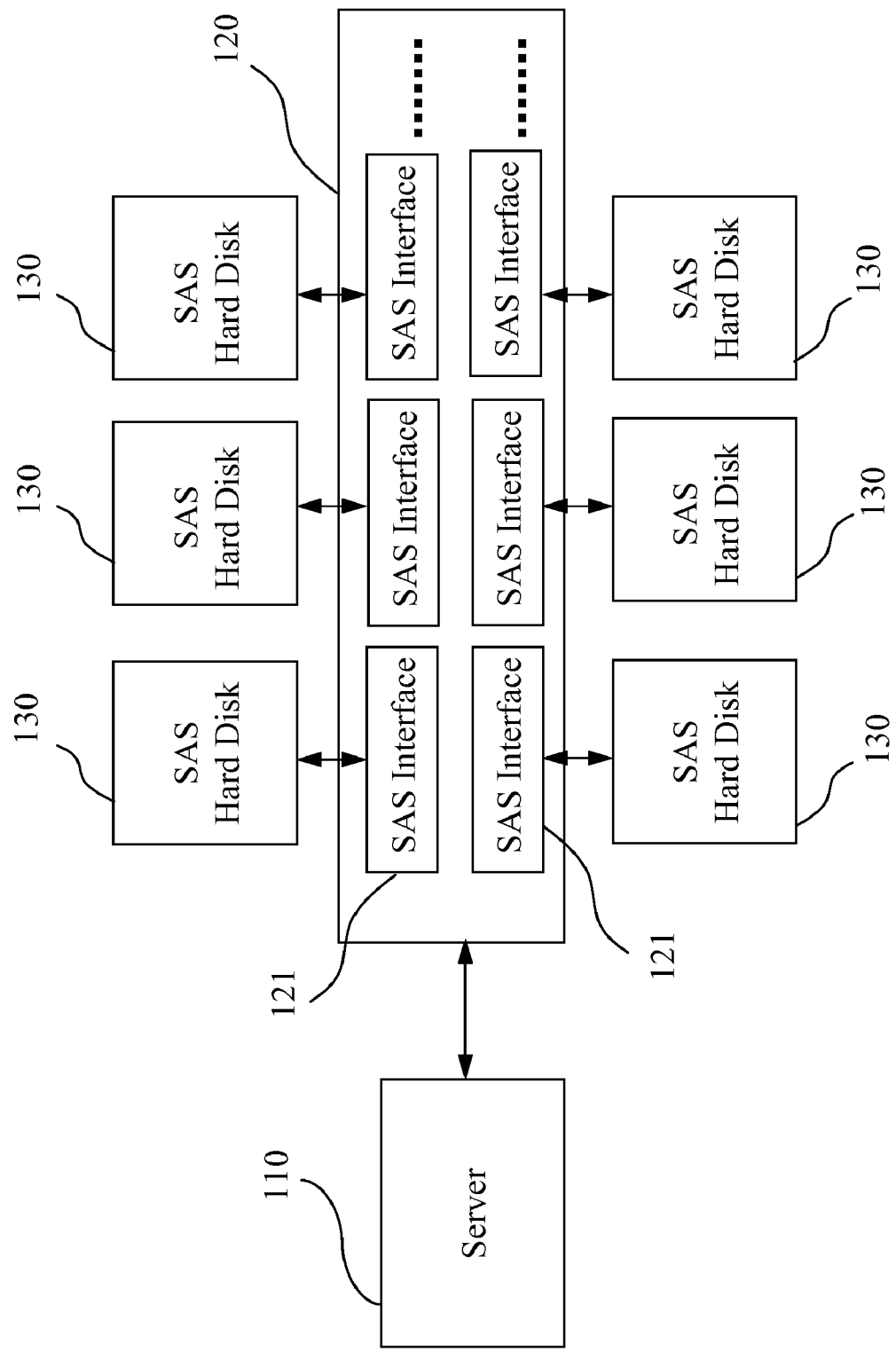
FIG. 1a is a schematic view of a conventional connection between a server and SAS hard disks.
Figure 1B:
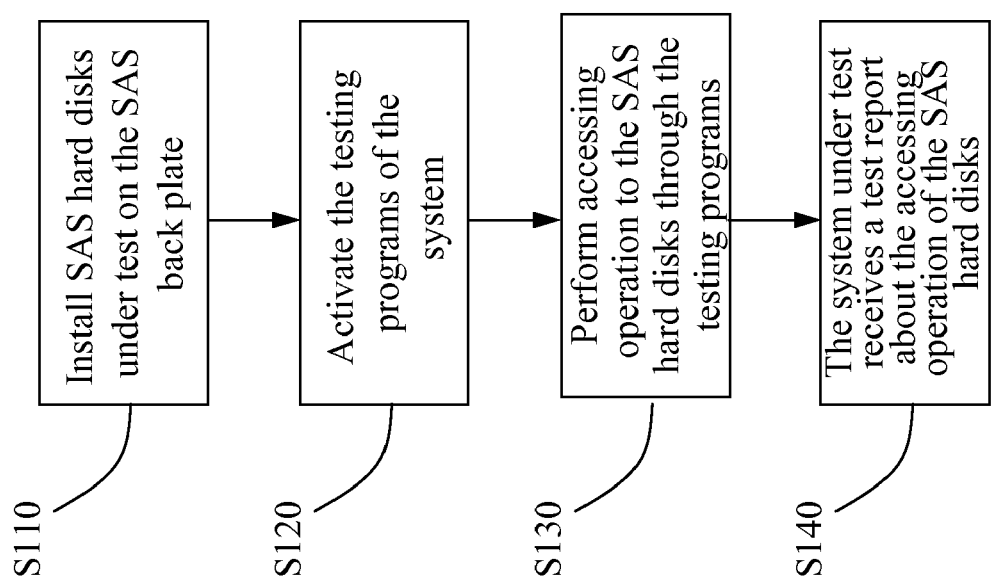
FIG. 1b is a flow chart of the detection of the conventional SAS channels.

In the present invention, a peripheral component interconnect express (briefly referred as PCI-E hereinafter) channel is bridged to SAS channels, and a control terminal detects whether the SAS channels run normally by receiving data from and sending data to the PCI-E device. The connection of PCI-E is established on the basis of (1-bit) point-to-point connection of a bidirectional sequence, which is referred as transmission lane. The PCI-E uses different transmission lanes when transferring and receiving data, and the connection between two PCI-E devices forms a link, thus forming one or more sets of transmission lanes. Each device at least supports the link of one transmission lane, and PCI-E can also has links of 2, 4, 8, 16, 32 lanes.

For example, a PCI-E includes 16 lanes, in other words, there are 16 low voltage difference signal sets, and each set has TX+/− and RX+/− data transmission lines, and thus, there are 64 bidirectional data transmission lines in total. The 16-lane PCI-E channel can provide 16 sets of SAS interfaces for connecting to the SAS hard disks. If using 32 lanes, the PCI-E can provide a maximum bandwidth of 10 GB, and the maximum bandwidth supported by the SAS channels reaches up to 6 GB. In this way, the PCI-E can preferably provide bidirectional compatibility.

Figure 2:
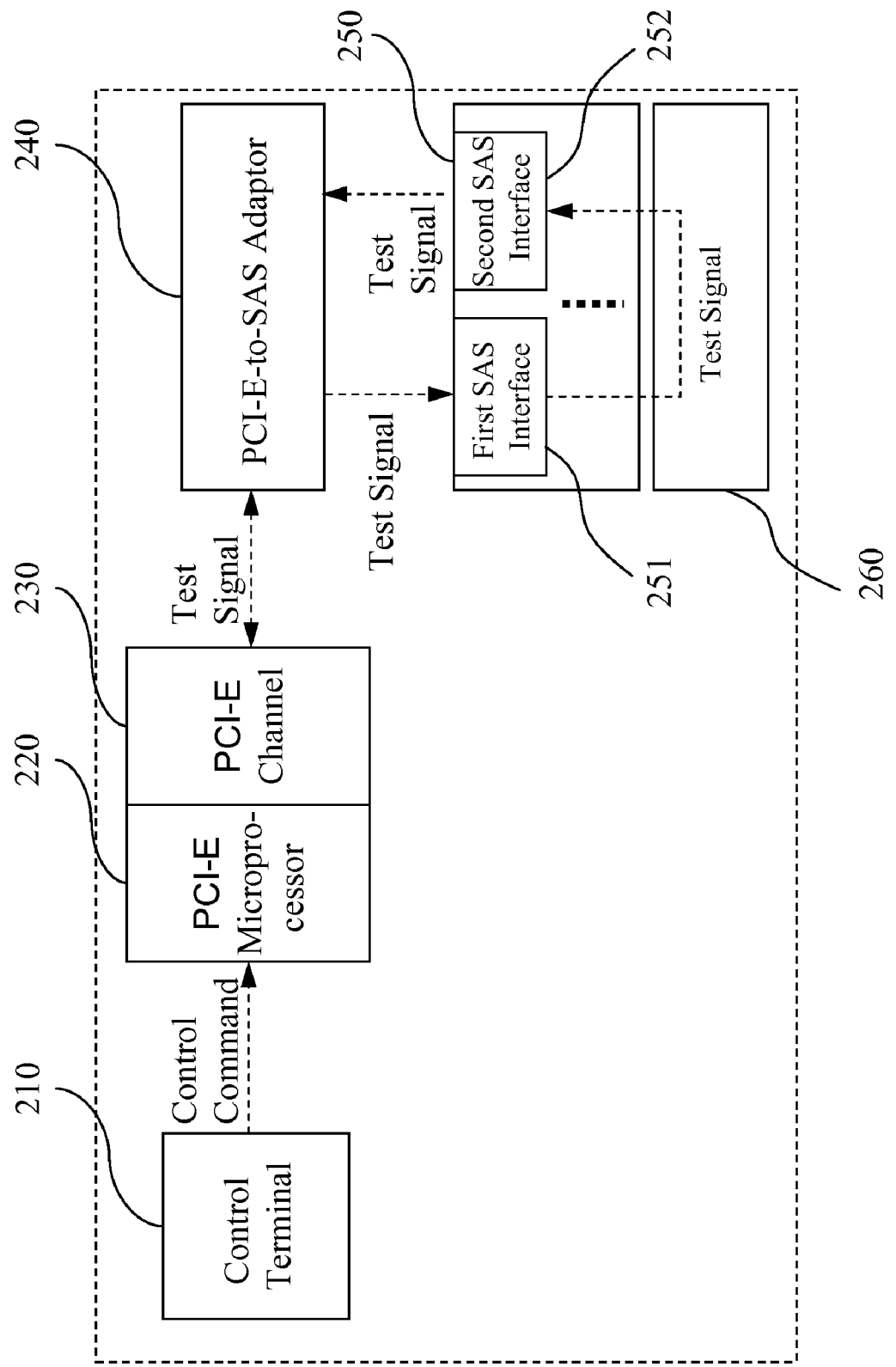
FIG. 2 is a schematic view of a device for detecting SAS channels according to the present invention.

Referring to FIG. 2, it is a schematic view of a device for detecting SAS channels according to the present invention. The device for testing SAS channels of the present invention includes a control terminal 210, a PCI-E microprocessor 220, a PCI-E channel 230, a PCI-E-to-SAS adaptor 240, and a signal feedback module 260.

The control terminal 210 selects the SAS channels and sends a control command. The control terminal 210 can be applied to different computer devices depending upon different conditions. For example, the control terminal 210 can be, but not limited to, a personal computer (PC) or a server. The PCI-E microprocessor 220 is electrically connected to the control terminal 210 and the PCI-E channel 230, for receiving a control command from the control terminal 210. The PCI-E microprocessor 220 sends a test signal to the PCI-E channel 230 according to the control command.

The PCI-E-to-SAS adaptor 240 is electrically connected to the PCI-E channel 230 and the SAS back plate 250, for converting the transmission signal between the PCI-E channel 230 and the SAS channels. The SAS back plate 250 further includes a plurality of pairs of SAS interfaces, and each pair of SAS interfaces is electrically connected to the signal feedback module 260 respectively. The signal feedback module 260 can be formed by, but not limited to, an integrated circuit or a jumper circuit. Additionally, in this embodiment, merely a first SAS interface 251 and a second SAS interface 252 in the SAS back plate 250 are taken as an example, but the present invention is not limited to having one pair of SAS interfaces.

The first SAS interface 251 and the second SAS interface 252 in the SAS back plate 250 are electrically connected to each other by the signal feedback module 260, such that the first SAS interface 251 outputs the received test signal to the second SAS interface 252, and the second SAS interface 252 sends the test signal back to the PCI-E microprocessor 220 through the PCI-E-to-SAS adaptor 240 and the PCI-E channel 230.

Figure 3:
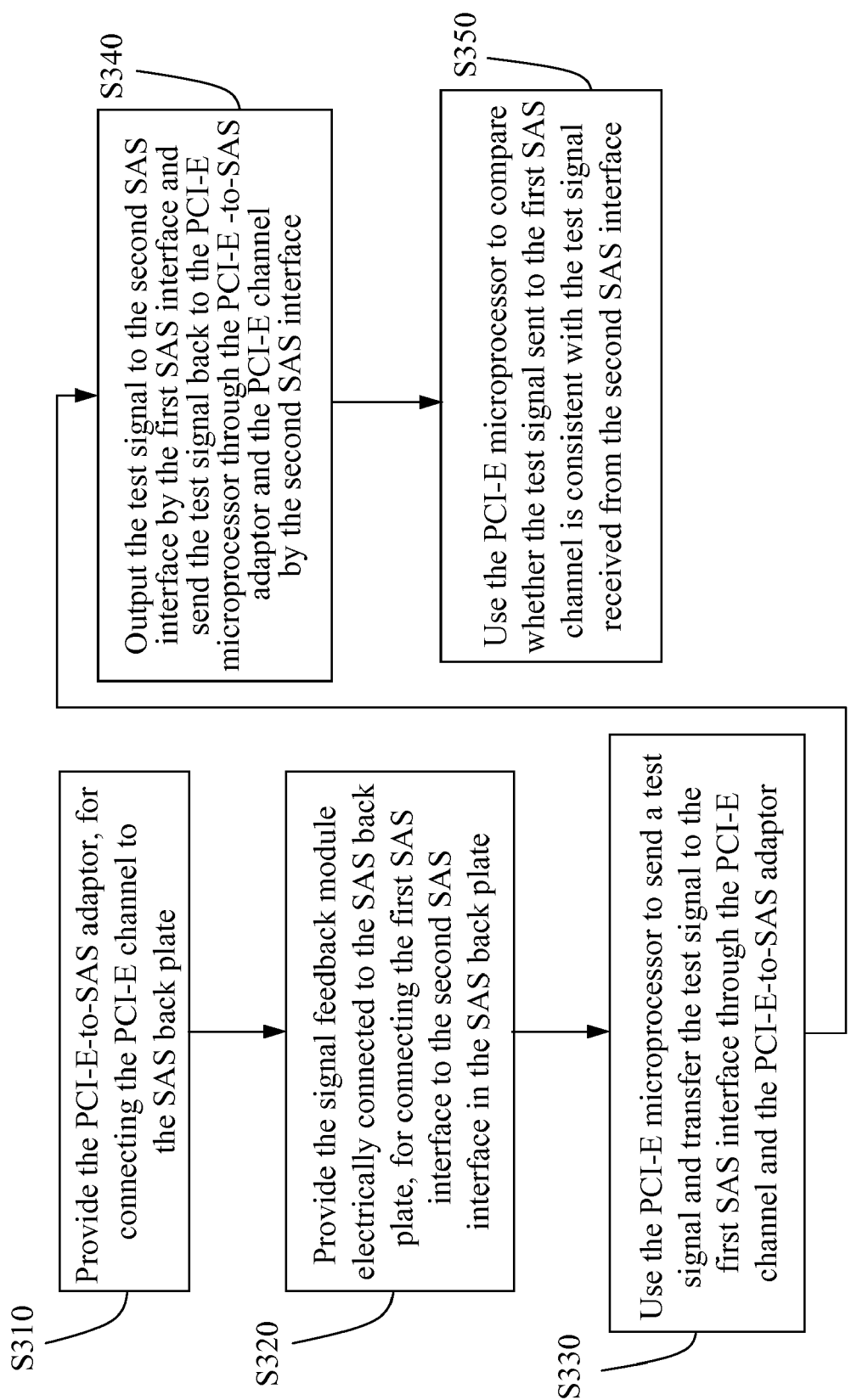
FIG. 3 is a flow chart of the detection of the SAS channels according to the present invention.

Referring to FIG. 3, it is a flow chart of the detection of the SAS channels according to the present invention. The method for detecting the SAS channels includes the following steps: providing the PCI-E-to-SAS adaptor 240, for connecting the PCI-E channel 230 to the SAS back plate 250 (S310); providing the signal feedback module 260 electrically connected to the SAS back plate 250, for connecting the first SAS interface 251 to the second SAS interface 252 in the SAS back plate 250 (S320); using the PCI-E microprocessor 220 to send a test signal and transferring the test signal to the first SAS interface 251 through the PCI-E channel 230 and the PCI-E-to-SAS adaptor 240 (S330); outputting the test signal to the second SAS interface 252 by the first SAS interface 251 and sending the test signal back to the PCI-E microprocessor 220 through the PCI-E-to-SAS adaptor 240 and the PCI-E channel 230 by the second SAS interface 252 (S340); using the PCI-E microprocessor 220 to compare whether the test signal sent to the first SAS channel are consistent with the test signal received from the second SAS interface (S350).

Figure 4:
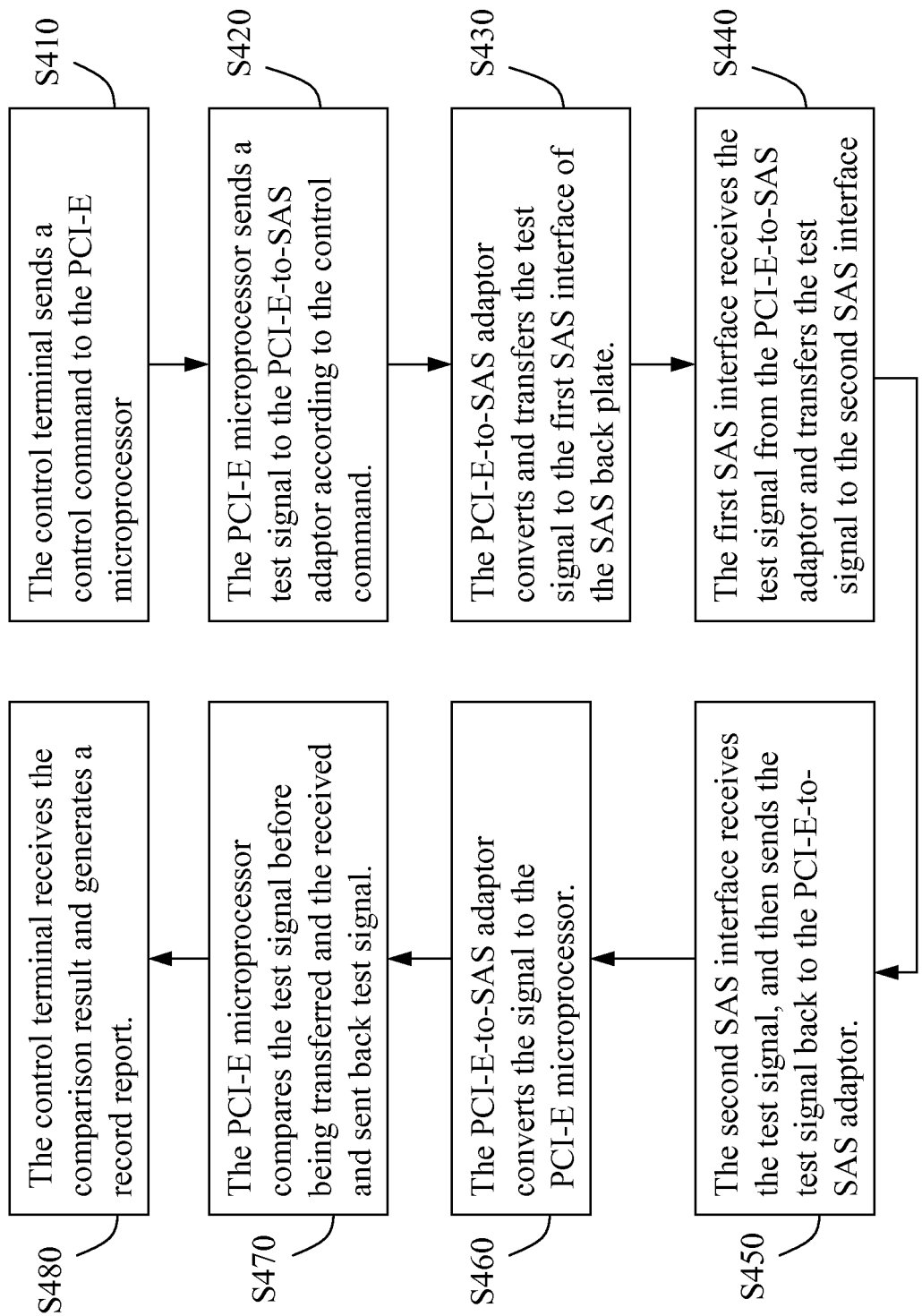
FIG. 4 is a flow chart of the operation of the device for detecting SAS channels according to the present invention.

In order to clearly explain the using method of the detection device of the present invention, it is illustrated below through the detailed operating process. Referring to FIG. 4, it is a flow chart of the operation of the device for detecting SAS channels according to the present invention. First of all, the control terminal 210 sends a control command to the PCI-E microprocessor (S410). Next, the PCI-E microprocessor sends a test signal to the PCI-E-to-SAS adaptor 240 according to the control command (S420). Then, the PCI-E-to-SAS adaptor 240 converts and transfers the test signal to the first SAS interface 251 of the SAS back plate 250 (S430, and S410-S430 are respectively corresponding to S330).

The first SAS interface 251 receives the test signal from the PCI-E-to-SAS adaptor 240 and transfers the test signal to the second SAS interface 252 (S440). The second SAS interface 252 receives the test signal from the first SAS interface 251, and then sends the test signal back to the PCI-E-to-SAS adaptor 240 (S450). The PCI-E-to-SAS adaptor 240 converts the signal to the PCI-E microprocessor (S460, S440-S460 are respectively corresponding to S350). The PCI-E microprocessor compares the test signal before being transferred and the received test signal (S470, corresponding to S350). The control terminal 210 receives the comparison result and generates a record report (S480). Afterwards, the control terminal 210 selects the next pair of SAS interfaces to be tested, and repeat S410 to S480 till each pair of SAS interfaces on all the SAS back plates 240 is tested.

In the present invention, besides using a PCI-E channel for bridging the SAS channel, the test signal passed through the first SAS interface 251 is further transferred to the second SAS interface through the signal feedback module 260. Next, the second SAS interface 252 sends the test signal back to the PCI-E microprocessor 220. Then, the PCI-E microprocessor 220 compares whether the test signal sent to the first SAS channel is consistent with the test signal received from the second SAS interface. Therefore, it is unnecessary to use SAS hard disks in the present invention, such that the time required for disassembling and assembling the SAS hard disks is saved, and various SAS channels can be detected in sequence. The maximum channel bandwidth of the PCI-E can be 10 GB, which is absolutely sufficient for supporting the SAS channel bandwidth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for testing SAS channels, applicable for a plurality of pairs of SAS interfaces included in an SAS back plate to detect whether the selected pair of SAS channels runs normally when transmitting data, comprising:
    a control terminal, for selecting SAS channels and sending a control command;
    a PCI-E microprocessor, electrically connected to the control terminal and a PCI-E channel, for receiving the control command from the control terminal and sending a test signal to the PCI-E channel according to the control command;
    a PCI-E-to-SAS adaptor, electrically connected to the PCI-E channel and the SAS back plate, for converting a transmission signal between the PCI-E channel and the SAS channels; and
    a signal feedback module, electrically connected to the SAS back plate, such that a first SAS interface, a second SAS interface in the SAS back plate are electrically connected to the signal feedback module, the first SAS interface outputs the received test signal to the second SAS interface, and the second SAS interface sends the received test signal back to the PCI-E microprocessor.

2. The device for testing SAS channels as claimed in claim 1, wherein the control terminal is a personal computer (PC) or a server.

3. The device for testing SAS channels as claimed in claim 1, wherein the number of the SAS interfaces in the SAS back plate is determined by the number of the plurality of lanes of the PCI-E channel.

4. The device for testing SAS channels as claimed in claim 1, wherein the PCI-E-to-SAS adaptor is an integrated circuit.

5. The device for testing SAS channels as claimed in claim 1, wherein the signal feedback module is an integrated circuit or a jumper circuit.

6. A method for testing SAS channels, applicable for a plurality of pairs of SAS interfaces included in an SAS back plate to detect whether the selected pair of SAS channels runs normally when transmitting data, comprising:
    providing a PCI-E-to-SAS adaptor, for connecting a PCI-E channel to the SAS back plate;
    providing a signal feedback module electrically connected to the SAS back plate, for connecting a first SAS interface to a second SAS interface in the SAS back plate;
    using a PCI-E microprocessor to send a plurality of test signals and then transferring the test signals to the first SAS interface, wherein the test signals are sent back to the PCI-E microprocessor via the second SAS interface; and
    using the PCI-E microprocessor to comparing whether the test signals sent to the first SAS channel are consistent with the test signals received from the second SAS interface.

7. The method for testing SAS channels as claimed in claim 6, further comprising receiving a comparison result of the PCI-E microprocessor by the control terminal and generating a record report.

8. The method for testing SAS channels as claimed in claim 6, wherein the step of sending the test signals to the first SAS interface further comprises: sending a plurality of test signals by the PCI-E microprocessor, and transferring the test signals respectively through the PCI-E channel and the PCI-E-to-SAS adaptor to the first SAS interface.

9. The method for testing SAS channels as claimed in claim 6, wherein the step of sending the test signals back to the PCI-E interface by the second SAS interface further comprises: outputting the test signals to the second SAS interface by the first SAS interface, and sending the test signals back to the PCI-E microprocessor through the PCI-E-to-SAS adaptor and the PCI-E channel by the second SAS interface.

* * * * *